March 18, 1930.    I. DROWNS    1,751,078
TOOL HOLDER
Filed April 23, 1928    2 Sheets-Sheet 1
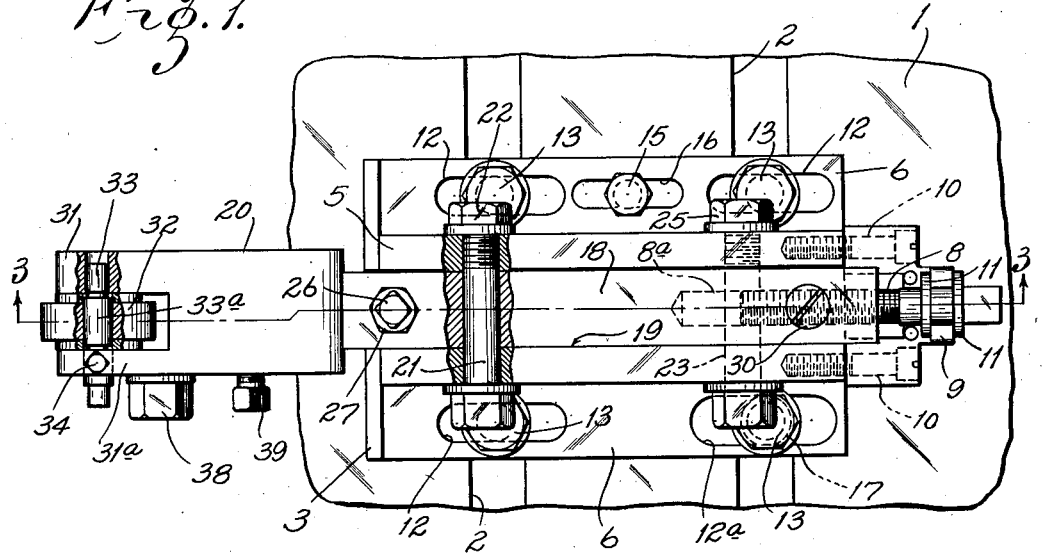
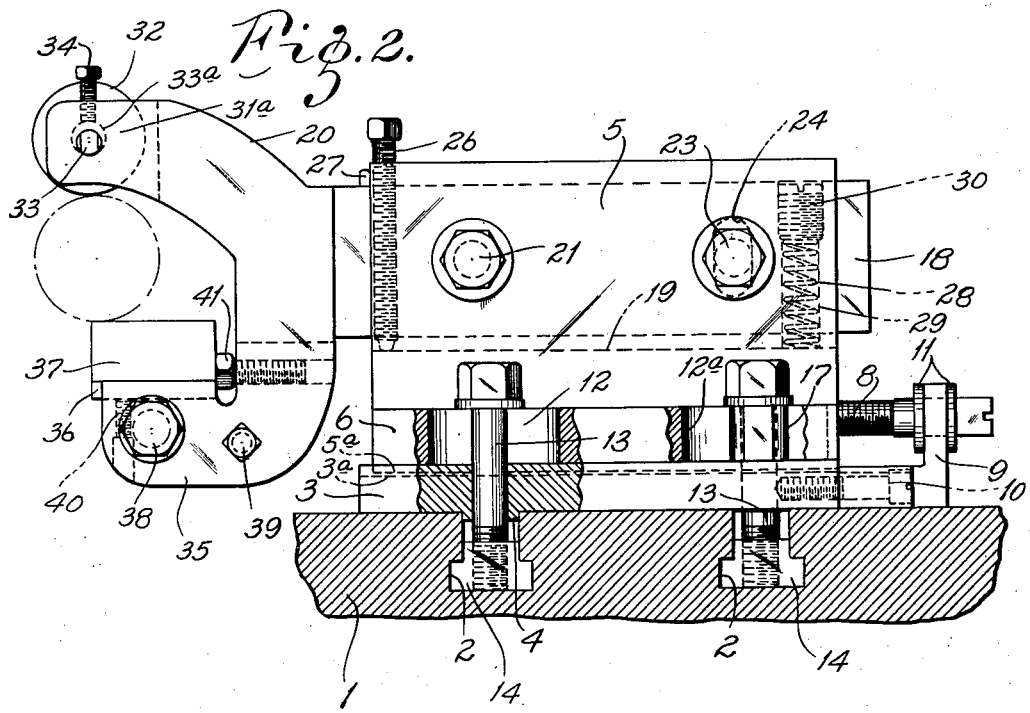
INVENTOR:
Irvin Drowns,
by Carr & Carr & Gravely,
HIS ATTORNEYS.

March 18, 1930.  I. DROWNS  1,751,078
TOOL HOLDER
Filed April 23, 1928   2 Sheets-Sheet 2
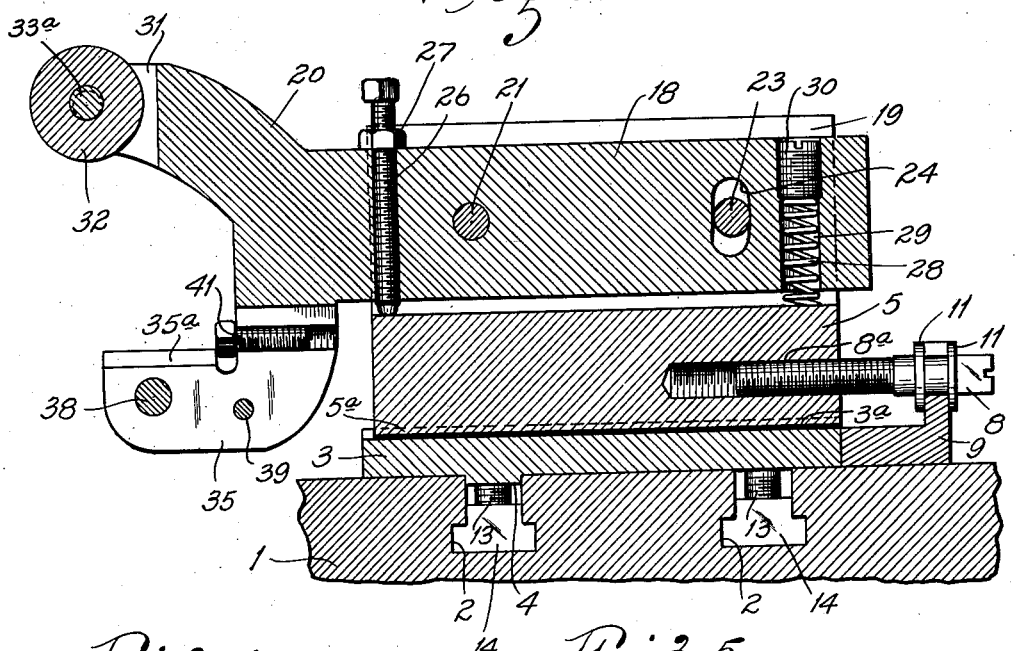

Patented Mar. 18, 1930

1,751,078

UNITED STATES PATENT OFFICE

IRVIN DROWNS, OF CANTON, OHIO, ASSIGNOR TO THE TIMKEN ROLLER BEARING COMPANY, OF CANTON, OHIO, A CORPORATION OF OHIO

TOOL HOLDER

Application filed April 23, 1928. Serial No. 272,089.

This invention relates to finishing tool holders particularly adapted for attachment to automatic screw machines and has for its principal object to provide a plurality of adjustments whereby the tool may be quickly and accurately positioned on the machine for different kinds of work. Other objects are simplicity and cheapness of construction and compactness of design. The invention consists in the tool holder and in the construction, combinations and arrangements of parts hereinafter described and claimed.

In the accompanying drawings, which form part of the specification and wherein like symbols refer to like parts wherever they occur, Fig. 1 is a top plan view of a finshing tool holder embodying my invention, the tool holder being shown attached to a portion of an automatic screw machine having T-slots in the face thereof;

Fig. 2 is a side elevation of a tool holder;

Fig. 3 is a longitudinal section on the line 3—3 in Fig. 1; and

Figs. 4 and 5 are front and rear views, respectively, of said tool holder.

Referring to the accompanying drawings, my invention is shown mounted on a portion 1 of an automatic multiple spindle screw machine having a pair of parallel T-slots 2 in the exterior face thereof. The tool holder comprises a rectangular base plate 3 adapted to be positioned on the portion 1 of the screw machine across the T-slots 2 therein. The base member is provided on its bottom surface near one end thereof with a rib 4, which extends from side to side of said base plate and is adapted to slidably engage the upper portion of one of the T-slots, whereby said base plate is slidable longitudinally of said T-slots.

Mounted on the base plate 3 of the tool holder is a channel-shaped body member 5 having outstanding base flanges 6 at its opposite side margins. The base portion of the body member 5 is of substantially the same size and shape as the base plate 3 and is provided along its bottom surface with a central longitudinal rib 5ª which fits within a slideway 3ª provided therefor in the upper surface of the base plate 3. As shown in the drawings, the slideway 3ª in the base plate 3, extends crosswise of the T-slots 2 in the screw machine whereby the body member 5 is slidable along said base plate transverse to said T-slots. The body member 5 is slid longitudinally of the slideway 3ª in the base plate 3 by means of an adjusting screw 8 which is threaded into a threaded bore 8ª provided therefor in the rear face of said body member and is rotatably supported near its outer end in an upwardly opening notch formed in the upstanding flange of a bracket 9 fastened to the rear end of the base plate by means of screws 10. The screw is provided with two longitudinally spaced collars 11, which straddle the notched flange of the screw supporting bracket 9 and thus prevent bodily movement of the adjusting screw in the direction of its axis.

The base flanges of the body member 5 are provided adjacent to the two front corners of said body member and adjacent to one of the rear corners thereof with elongated slots 12 that extend longitudinally of said flanges and crosswise of the T-slots 2. The other rear corner of the body member is also provided with an elongated slot 12ª which also extends longitudinally of the base flange, but is slightly longer and wider than the slots 12 in the other corner of said body member. The tool holder is adjustably secured to the face of the automatic screw machine by four cap screws 13 which extend through the slots 12 and 12ª at the corners of the body member and through openings which extend through the corner portions of the base plate 3 and register with said slots. The threaded end portions of the cap screws 13 extend into the T-slots 2 in the face of the screw machine and are provided with T-nuts 14 slidable in said T-slots. The body member 5 is clamped to the base plate 3 independently of the clamping screws 13 by means of a cap screw 15 which extends through a slot 16 located between and in alinement with the two slots 12 at one side of the body member and is threaded into a threaded opening provided therefor in said base plate. The clamping screw for the slot 12ª in the body member 5 extends through a spacing collar 17 located in said slot, which collar is of a length corresponding to the thickness of the base flange 6 through which said slot extends, whereby the operation of tightening said screw serves to clamp the base plate 3 to the machine, but does not serve to clamp the body member to said base plate. As shown in the drawing, the collar 17 is provided with diametrically opposed flat faces adapted to cooperate with the sides of the slot 12ª and thus prevent rotation of said collar in said slot.

By the arrangement thus far described, the entire tool holder, including the base plate 3 and the body member 5 may be adjusted longitudinally of the T-slots 2 by loosening the four clamping screws 13, after which said tool holders may be clamped to the machine in the desired position of adjustment by tightening said clamping screws 13. The body member 5 may be adjusted transversely of said T-slots independently of the base plate 3 by manipulation of the adjusting screw 8 after releasing the clamping screws which cooperate with the three slots 12 and disengaging the screw 15 from the base plate. During the adjustment of the body member 5 on the base plate 3 in directions transverse to the T-slots 2, the screw in the slot 12ª is left tight and thus serves to prevent movement of the tool holder longitudinally of said T-slots without interfering with the sliding movement of said tool holder on the base plate 3. The cap screw in the slot 12ª serves to clamp the base plate 3 to the face of the machine, but the spacing collar 17 prevents the body member from being clamped to the base plate by said screw, while the rib 4 on the bottom face of the base plate engages the other T-slot and thus prevents swiveling of the base plate about the cap screw as a pivot. By this arrangement, the tool holder may be adjusted independent of the base plate without disturbing the position of adjustment of the latter.

A tool arm has a shank portion 18 adapted to be positioned within a central longitudinal channel 19 provided therefor in the top of the body member 5 and a bifurcated head portion 20 located beyond the outer end of said channel. The shank 18 of the tool arm is pivotally secured in the channel portion 19 of the body member 5 for limited rocking or tilting movement therein by means of a pivot screw 21 which passes through registering holes provided therefor in the shank of the tool arm and in the side walls of the channel. As shown in the drawing, the end portion of the screw is threaded through one wall of the channel and is provided with a lock nut 22. The tool arm is locked in any desired position of its tilting movement by means of a clamping screw 23, which extends through an arcuate slot 24 in the shank 18 of the tool arm and through alined holes in the side walls of the shank supporting channel, the side walls of the arcuate slot being curved in arcs described from the center of the pivot screw 21. The end of the clamping screw 23 is threaded through one wall of the channel and is provided with a lock nut 25. With this arrangement, the tool arm may be tilted in the channel about the pivot screw 21 as a center and may be locked in the desired position of its tilting movement by tightening the clamping screw 23.

The tool arm is tilted about the pivot screw 21 as a center by means of a set screw 26 which is threaded through the shank 18 of the tool arm and bears against the bottom of the channel 19. The set screw 26 is locked to the shank in its desired position of adjustment by means of a lock nut 27 on the upper end thereof. The rear end of the shank of the tool arm is forced outwardly in the channel 27ª to yieldably maintain the adjusting screw 26 in engagement with the bottom of said channel by means of a spring 28 located in a bore 29 provided therefor in said shank portion. One end of the spring 28 bears against the bottom of the channel and the other end thereof bears against a headless screw 30 threaded in the outer end of the bore 29, which screw serves to retain the spring in said bore and as a means to adjust the tension of the opening.

The outer end of the upper arm 31 of the bifurcated head 20 of the tool arm is bifurcated to receive a work support in the form of a roller 32 which is journaled on an eccentric portion 33ª of a pivot pin 33 whose ends are rotatably supported in the two branches of said upper arm. With this arrangement, the roller may be adjusted towards and away from the work by rotating the pivot pin 33 in its bearings to shift center of the eccentric roller supporting portion 33ª of said pin. The pivot pin may be locked in any desired position of adjustment by means of a set screw 34 which is threaded through one of the branches of the upper arm 31ª and bears against the end of the pin journaled therein.

The lower arm 35 of the head of the tool arm is provided along its upper surface with a dovetail slideway 35ª adapted to receive the dovetail rib 36 of a forming tool in the form of a finishing or shaving tool 37. The lower arm 35 is slotted in the directions longitudinally of the dovetail slideway 35ª from end to end thereof to form resilient portions which are drawn together to clamp the tool 37 in the slideway by means of a cap screw 38 which extends through alined openings in said resilient portions and has threaded engagement with one of said openings. The resilient portions of the lower tool supporting arm of the head of the tool arm are spread apart to permit sliding movement of the tool 37 in the dovetail slideway 36 by means of a set screw 39 which is threaded through the said arm on one side of the slot and bears against the opposite side of said slot. The tool 37 is further clamped in the dovetail slideway 36 by means of set screws 40, which are threaded through the resilient portions of the arm and bear against the underside of said tool. Rearward sliding movement of the tool 37 under pressure of the work thereagainst is prevented by means of an adjustable stop in the form of a screw 41 which is threaded into the head of the tool holder with its head in position to be engaged by the rear end of the said tool.

The hereinbefore tool holder may be readily attached to the machine and quickly and accurately adjusted for different kinds of work, thereby minimizing the amount of scrap or waste product resulting from the operation of "setting up" the tool holder for a new job. The tool holder is strong and rigid and is of simple and economical construction; and it produces smoother work by eliminating chatter and works closer to size than has heretofore been practicable.

Obviously, numerous changes may be made without departing from my invention; therefore, I do not wish to be limited to the exact form of tool holder, work support and tool shown and described.

What I claim is:

1. A tool holder for screw machines or the like, comprising a base member adapted to be slidably mounted on said machine, a body member mounted on said base member for sliding movement at an angle to the direction of sliding movement of said base member, a tool arm mounted on said body member, means for locking said base member and said body member together and to said machine in any position of their sliding movements, means independent of the combined base member and body member locking means for locking the body member to the base member in any position of its sliding movement thereon, and means independent of said first and second mentioned locking means for locking said base plate to said machine in any desired position of its sliding movement thereon.

2. A tool holder for screw machines or the like comprising a base member adapted to be slidably mounted on said machine, a body member mounted on said base member for sliding movement in a direction transverse to the direction of the sliding movement of said base member, a tool arm mounted on said body member, means for clamping said body member to said base member and the latter to said machine in all positions of their sliding movements, separate means for clamping said body member to said base member independently of the combined body and base clamping means, and separate means for clamping said base member to said machine independently of said first and second mentioned clamping means.

3. A tool holder for screw machines or the like comprising a base member adapted to be slidably mounted on said machine, a body member mounted on said base member for sliding movement in directions transverse to the direction of sliding movement of said base member, means for locking said base member and said body member together and to said machine in any position of their sliding movements, separate means for clamping said base member to said machine and said body member to said base member, a tool arm pivotally mounted on said body member, and means for clamping said tool arm to said body member in any desired position of its pivotal movement.

4. A tool holder for screw machines or the like comprising a base member adapted to be slidably mounted on said machine, a body member mounted on said base member for sliding movement thereon in directions transverse to the direction of sliding movement of said base member, separate means for clamping said base member to said machine and said body member to said base member, a tool arm pivotally mounted on said body member, means for swinging said tool arm on its pivot, and means for clamping said tool arm to said body member in any desired position of its pivotal movement.

5. A tool holder for screw machines or the like comprising a base member adapted to be slidably mounted on said machine, a body member mounted on said base member for sliding movement in directions transverse to the direction of sliding movement of said base member, separate means for clamping said base member to said machine and said body to said base member, a tool arm pivotally mounted on said body member, means for clamping said tool arm to said body member in any desired position of its pivotal movement, and means for swinging said tool arm on its pivot, said tool arm swinging means comprising a screw threaded through said tool arm and bearing against said body member.

6. A tool holder for screw machines or the like comprising a base member adapted to be slidably mounted on said machine, a body member mounted on said base member for sliding movement in directions transverse to the direction of sliding movement of said base member, separate means for clamping said base member to said machine and said body to said base member, a tool arm pivotally mounted on said body member, means for clamping said tool arm to said body member in any desired position of its pivotal movement, means for swinging said tool arm on its pivot, said tool arm swinging means comprising a screw threaded through said tool arm and bearing against said body member, and spring means for yieldably holding said adjusting screw in engagement with said body member.

7. A tool holder for screw machines or the like comprising a base member adapted to be slidably mounted on said machine, a body member mounted on said base member for sliding movement in directions transverse to the direction of sliding movement of said base member, separate means for clamping said base member to said machine and said body to said base member, a tool arm pivotally mounted on said body member, means for clamping said tool arm to said body member in any desired position of its pivotal movement, means for swinging said tool arm on its pivot, said tool arm swinging means comprising a screw threaded through said tool arm and bearing against said body member, spring means for yieldably holding said adjusting screw in engagement with said body member, and means for varying the tension of said spring.

8. A tool holder for screw machines or the like comprising a base member adapted to be slidably mounted on said machine, a body member mounted on said base member for sliding movement in directions transverse to the direction of sliding movement of said base member, separate means for clamping said base member to said machine and said body member to said base member, a tool arm mounted on said body member, a pin rotatably supported in said tool arm and provided with an eccentric portion, a roller journaled on the eccentric portion of said pin, and means on said tool arm for locking said pin in any position of its rotary movement.

9. A tool holder for screw machines or the like comprising a base member adapted to be slidably mounted on said machine, a body member mounted on said base member for sliding movement in directions transverse to the direction of sliding movement of said base member, separate means for clamping said base member to said machine and said body member to said base member, a tool arm pivotally mounted on said body member, means for clamping said tool arm to said body member in any desired position of its pivotal movement, a pin rotatably supported in said tool arm and provided with an eccentric portion, a roller journaled on the eccentric portion of said pin, and means on said tool arm for locking said pin in any position of its rotary movement.

10. A tool holder for screw machines or the like comprising a base member adapted to be slidably mounted on said machine, a body member mounted on said base member for sliding movement in directions transverse to the direction of sliding movement of said base member, separate means for clamping said base member to said machine and said body member to said base member, a tool arm pivotally mounted on said body member, means for clamping said tool arm to said body member in any desired position of its pivotal movement, a tool slidable on said arm, means for clamping said tool to said arm, and an adjustable stop on said arm for limiting the sliding movement of said tool in one direction.

11. The combination with a screw machine or the like, provided with parallel T-slots, of a tool holder comprising a base member provided with holes adapted to register with said T-slots, a body member slidable on said base member at an angle to said T-slots and provided with elongated slots extending parallel to the direction of sliding movement of said body member and registering with holes in said base member, a tool arm mounted on said body member, screws extending through the elongated slots in the said body member and the holes in said base plate into said T-slots, and T-nuts mounted in said T-slots and threaded on said screws.

12. The combination with a screw machine or the like provided with parallel T-slots, of a tool holder comprising a base member provided with holes adapted to register with said slots, a body member slidable on said base member in directions transverse to said T-slots and provided with elongated slots extending in the direction of sliding movement of said body member and registering with the holes in said base member, a tool arm mounted on said body member, and clamping screws extending through the elongated slots in said body member and the holes in said base plate and into said T-slots, T-nuts mounted in said T-slots and threaded on said screws, and means cooperating with one of said screws for preventing said screw from clamping said body member to said base member.

13. The combination with a screw machine or the like, provided with parallel T-slots, of a tool holder comprising a base member provided with holes adapted to register with said slots, a body member slidable on said base member in directions transverse to said T-slots and provided with elongated slots extending in the direction of the sliding movement of said body member and registering with the holes in said base member, a tool arm mounted on said body member, clamping screws extending through the elongated slots in said body member and the bolt holes in said base plate and into said T-slots, T-nuts mounted in said T-slots and threaded on said screws, a clamping screw extending through an elongated slot provided therefor in said body member and threaded into said base member, and means cooperating with one of said first mentioned clamping screws for preventing the same from clamping said body member to said base member.

14. The combination with a screw machine or the like, provided with parallel T-slots, of a tool holder comprising a base member provided with holes adapted to register with said slots, a body member slidable on said base member in directions transverse to said T-slots and provided with elongated slots extending in the direction of the sliding movement of said body member and registering with the holes in said base member, a tool arm pivotally mounted on said body member, clamping screws extending through the elongated slots in said body member and the bolt holes in said base plate and into said T-slots, T-nuts mounted in said T-slots and threaded on said screws, a clamping screw extending through an elongated slot provided therefor in said body member and threaded into said base member, means cooperating with one of said first mentioned clamping screws for preventing the same from clamping said body member to said base member, means for clamping said tool arm to said body member in any position of its pivotal movement, a working supporting roller journaled on said tool arm, means for adjusting said roller in directions transverse to its axis, a tool block slidably mounted on said arm, means for clamping said tool block to said arm, and an adjustable stop on said tool arm for limiting the sliding movement of said tool block in one direction.

Signed at Canton, Ohio, this 18th day of April, 1928.

IRVIN DROWNS.